United States Patent
Moon et al.

(10) Patent No.: US 6,408,338 B1
(45) Date of Patent: Jun. 18, 2002

(54) METHOD OF GENERATING INFORMATION FOR FAST SEARCHING OF PACKET DATA, RECORDING MEDIUM STORING THE INFORMATION, AND RECORDING AND/OR PLAYBACK APPARATUS USING THE SAME

(75) Inventors: Seong-jin Moon; Sung-wook Park; Bong-gil Bak; Jung-suk Kang, all of Seoul; Pan-gie Park, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/464,999

(22) Filed: Dec. 16, 1999

(30) Foreign Application Priority Data

Dec. 16, 1998 (KR) ............................................. 98-55499
Jan. 14, 1999 (KR) ................................................ 99-839

(51) Int. Cl.$^7$ ............................. G06F 15/16; H04N 5/91
(52) U.S. Cl. ........................... 709/231; 386/68; 386/69; 386/109; 386/111; 386/112; 386/113; 386/70
(58) Field of Search .......................... 709/231; 386/68, 386/69, 109, 111, 112, 113, 70

(56) References Cited

U.S. PATENT DOCUMENTS

| | | | | |
|---|---|---|---|---|
| 5,532,835 A | * | 7/1996 | Nakagaki et al. | 358/335 |
| 5,615,018 A | * | 3/1997 | Wu et al. | 386/68 |
| 5,712,947 A | * | 1/1998 | Oguro et al. | 386/69 |
| 5,729,649 A | * | 3/1998 | Lane et al. | 386/68 |
| 5,862,296 A | * | 1/1999 | Oyama | 386/69 |
| 5,920,675 A | * | 7/1999 | Adolph et al. | 386/68 |
| 6,124,995 A | * | 9/2000 | Kim | 360/48 |
| 6,169,843 B1 | * | 1/2001 | Lenihan et al. | 386/46 |

FOREIGN PATENT DOCUMENTS

| | | |
|---|---|---|
| EP | 0 634 867 A2 | 1/1995 |
| EP | 0 731 606 A2 | 9/1996 |
| EP | 0 847 195 A1 | 6/1998 |

* cited by examiner

*Primary Examiner*—Ayaz Sheikh
*Assistant Examiner*—Frantz B. Jean
(74) *Attorney, Agent, or Firm*—Staas & Halsey LLP

(57) ABSTRACT

A method of generating information used for fast searching of packet data, a recording medium for storing the information, and a recording and/or playback apparatus using the same. Packet data is segmented into basic units of a predetermined size and basic unit information is generated for each basic unit. The basic unit information includes information indicating the arrival time of the first packet of each corresponding basic unit. This information is recorded with a data stream and used when quickly searching for a desired position during special playback such as a time search. If a fast search method such as binary searching is adopted, significantly faster searching can be realized.

57 Claims, 10 Drawing Sheets

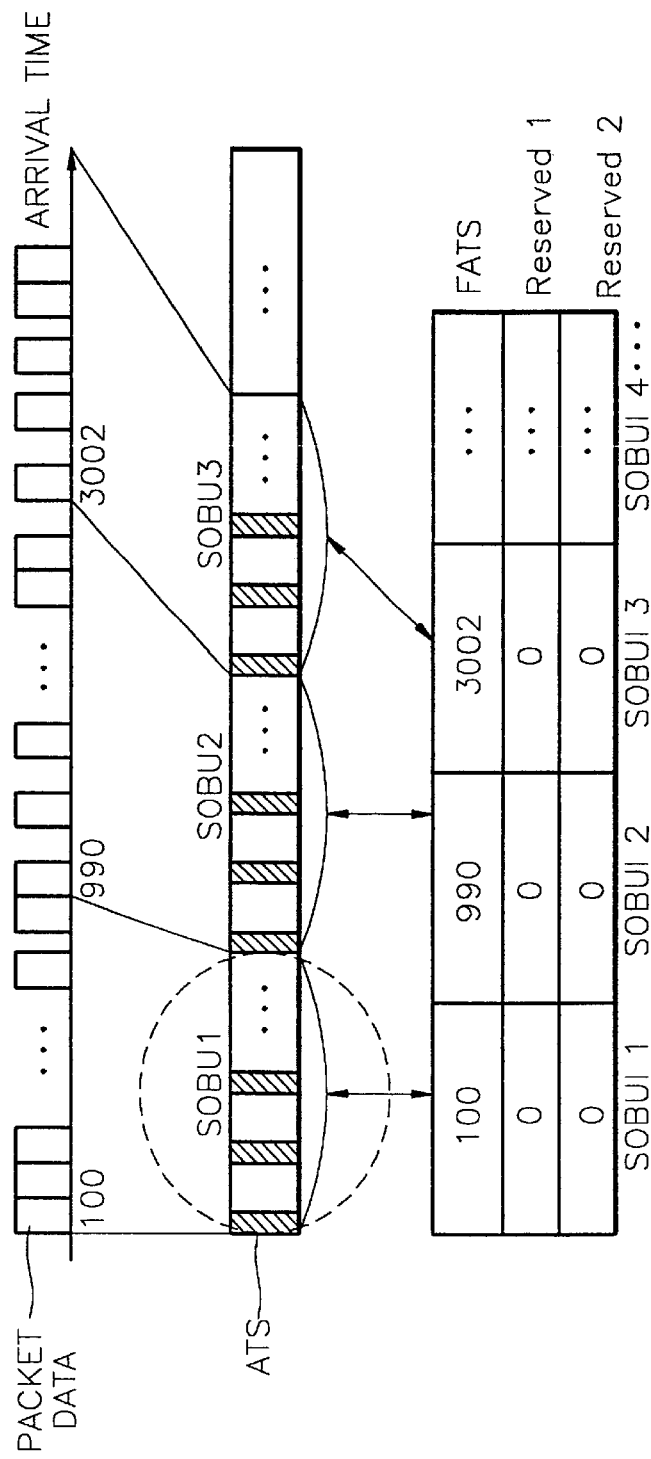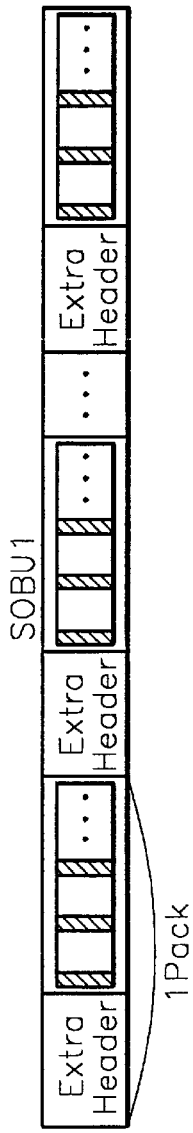

METHOD OF GENERATING INFORMATION FOR FAST SEARCHING OF PACKET DATA, RECORDING MEDIUM STORING THE INFORMATION, AND RECORDING AND/OR PLAYBACK APPARATUS USING THE SAME

CROSS-REFERENCE TO RELATED APPLICATIONS

This application claims the benefit of Korean Application Nos. 98-55499, filed Dec. 16, 1998, and 99-839, filed Jan. 14, 1999, in the Korean Patent Office, the disclosures of which are incorporated herein by reference.

BACKGROUND OF THE INVENTION

1. Field of the Invention

The present invention relates to fast searching of digital data, and more particularly, to a method of generating additional information used to quickly search for a desired position in a data stream, after storing data which is packetized (hereinafter, called "packet data") in a recording medium, a recording medium for storing the information and a recording and/or playback apparatus using the same.

2. Description of the Related Art

Recording and/or playback apparatuses which store and/or reproduce packet data, which is used in digital satellite broadcasting or in digital high definition broadcasting, in a one dimensional recording medium such as a tape and which implement special playback such as trick-play, have been developed. Moreover, an optical recording and/or playback apparatus or multimedia equipment using optical disks requires the function of recording packet data in a two dimensional recording medium such as an optical disk and quickly accessing a desired position during special playback such as time search to play back only necessary data.

FIG. 1 shows the basic form of recorded data including input packet data and its arrival time and the conceptional relation between the recorded data and data output time intervals during playback. When recording input data, an arrival time stamp (ATS), which is arrival time information, is added to the input data and the data is output based on the added ATS during playback. Here, the input data is packetized data which is obtained by dividing data such as video or audio into units of a predetermined size. The packetized data is transmitted through satellites, cables or local area networks (LANs). The size of the unit is 188 bytes when data is transmitted using a Moving Picture Experts Group (MPEG)-2 transport stream defined by the International Organization for Standardization (ISO)/International Electrotechnical Commission (IEC) 13818-1 standard, and is 53 bytes when data is transmitted using an asynchronous transfer mode (ATM) standard.

In digital broadcasting, packet data is transmitted at irregular time intervals. The transmitted packet data is usually received by a receiving party having a decoder. In the receiving party, the transmitted data is input into the decoder via a buffer and decoded by the decoder so that users can watch the broadcasting.

When a user sets a playback mode to reproduce, at a desired time, packet data, which has been stored in a recording medium, is sent to the decoder by a playback apparatus. When sending the data to the decoder, the irregular time intervals at which the packet data was originally transmitted to the receiving party are significant because the buffer of the receiving party overflows or underflows if the irregular time intervals are not obeyed. This is because, when transmitting data, an original transmitting party (a broadcasting station) adjusts the time intervals between packet data taking into account the state of the buffer of a receiving party having a decoder. For this reason, it is assumed that information on the arrival time of each packet of data is added to each corresponding packet of input data when a recording apparatus records data, and each packet of data is output by a playback apparatus based on the arrival time information thereof.

FIG. 2 is a block diagram showing a recording and playback apparatus for the packet data shown in FIG. 1. In FIG. 2, a counter 102, which operates according to a system clock signal, usually uses a system clock signal of 27 MHz because the MPEG-2 system generates time stamps on the basis of a clock signal of 27 MHz. It is needless to say that a system clock signal of another frequency can be used.

An ATS generator 104 adds an ATS to each packet of input data. The input packet data together with the added ATSs is converted into a signal suitable for recording by a recording controller 106 and then recorded in a recording medium 108. A playback controller 110 plays back to which ATSs have been added, which is recorded in the recording medium 108 and sends the playback data to an ATS processor 112. The ATS processor 112 outputs the data according to the added ATS of the playback data. Here, the ATS generator 104 and the ATS processor 112 each includes an internal buffer. Alternately, the buffers of the ATS generator 104 and the ATS processor 112 may be separately provided on the outside.

In the method of adding an ATS, during recording, the ATS generator 104 reads a count value of the counter 102 at the time when packet data is input, and adds the count value to the packet as an ATS. The packet data with the added ATS is temporarily stored in the internal buffer of the ATS generator 104 and then recorded in the recording medium 108 via the recording controller 106. As mentioned above, the internal buffer can be separately provided on the outside of the ATS generator.

During playback, the playback controller 110 plays back the packet data with the added ATS from the recording medium 108 and sends the playback data to the ATS processor 112. The ATS processor 112, which includes a buffer of a predetermined size, temporarily stops reading data when the buffer overflows, and restarts the reading when the buffer is empty, repeatedly. The ATS processor 112 reads the ATS and corresponding packet data of a first packet, from its internal buffer, and sets the counter 102 based on the ATS while outputting the packet data. The output data of the ATS processor 112 is pure packet data from which the ATS has been removed. Thereafter, packet data is output only when the added ATS of the packet is determined to have the same value as the count value of the counter 102 by comparing the ATS with the count value. The buffer included in the ATS processor 112 may also be separately provided on the outside. Due to such configuration and operation as described above, data can be transmitted to a receiving party having a decoder while the original time intervals of packet data are maintained during playback so that decoding can be smoothly performed.

In addition to simple playback functions in which recorded data is sequentially played back from beginning to end, special playback functions, which are provided in analog recording and playback apparatuses such as existing video cassette recorders (VCRs) and in digital audio and video (AV) apparatuses which record or play back data in or from two dimensional recording media such as video CD and DVD, must be supported. Accordingly, a fast search function is used in playing back of data starting from an arbitrary position of a data stream. For example, time searching is representatively used to perform playback starting from data corresponding to a desired time or data soon after the desired time, instead of starting from the beginning. In this case a fast search function is desired. In addition, it is necessary to quickly search for desired positions when a user collects data streams from various positions on a recording medium to make a new playback order of the collected data streams and plays back the data streams in the new order.

FIG. 3 is a diagram for explaining a time search in a case where data with an ATS is recorded without a special information structure. Referring to FIG. 3, if it is assumed that a specified target time is ATS1, every ATS is quickly read starting from the beginning of a data stream, and the values of ATSs, which are added to packets, are compared with the value of ATS1 in order to find out the position of data corresponding to the time slot of ATS1. As the result of the comparison, data packets having ATS values smaller than the value of ATS1 are all discarded, and playback is performed starting from the packet data having an ATS value equal to or larger than the value of ATS1. Accordingly, when a special information structure for fast searching is not provided, since every data item must be read and checked from the beginning to find desired data, there is a problem that it takes too much time to search the data.

SUMMARY OF THE INVENTION

To solve the above and other problems, it is an object of the present invention to provide a method for generating information for facilitating special playback such as fast searching, after recording digital data having a packet structure which is used in digital satellites, digital terrestrial waves, digital cable broadcasting or asynchronous transfer mode (ATM) transmission networks.

It is another object of the present invention to provide a recording medium for storing information for facilitating the implementation of a special playback function such as time searching, on a recording medium such as an optical disk which allows random access unlike a one dimensional medium such as a tape.

It is still another object of the present invention to provide a recording and/or playback apparatus for recording information for fast searching of a recording medium, quickly searching for a position which a user desires to playback data, using the recorded information for fast searching, and playing back data starting from the corresponding position.

Additional objects and advantages of the invention will be set fourth in part in the description which follows and, in part, will be obvious from the description, or may be learned by practice of the invention.

Accordingly, to achieve the first object and other objects of the present invention, there is provided a method of generating information for fast searching. The method includes the steps of segmenting a data stream comprising input packet data, into a plurality of basic units, each basic unit having a predetermined size, generating basic unit information related to each of the basic units of the data stream, and generating data stream information including a plurality of the basic unit information, each of the basic unit information of the basic unit having arrival time information of a first packet of data of a corresponding basic unit.

To achieve the second object and other objects of the present invention, there is provided a recording medium including a first area having a data stream which includes packet data of a plurality of basic units of a predetermined size, and a second area having data stream information which includes a plurality of basic unit information of basic units having arrival time information of a first packet of data of corresponding ones of the basic units, wherein a desired position in the data stream of the first area is quickly searched based on the data stream information of the second area.

To achieve the third object and other objects of the present invention, there is provided a recording apparatus including a data stream information generator for segmenting a data stream comprising input packet data into basic units of a predetermined size and generating data stream information having a plurality of basic unit information, each of the basic unit information of the basic unit including arrival time information of a first packet of data of a corresponding one of the basic units; and a recording controller for recording the data stream is recorded in a first area of a recording medium and the data stream information is recorded in a second area of the recording medium.

There is also provided a playback apparatus for playing back data recorded in a recording medium which includes a first area having a data stream which includes packet data and a second area having data stream information which includes a plurality of basic unit information, each of the basic unit information of the basic unit having arrival time information of a first packet of data of a corresponding one of the basic units, the basic unit which is obtained by segmenting the data stream in the first area into units of a predetermined size. The playback apparatus includes a data stream information processor for comparing the arrival time of a target position with arrival time information of each of a first packet of data of corresponding one of the basic units, so as to search the arrival time information corresponding to the arrival time of the target position and for detecting position information of the basic unit corresponding to the searched arrival time information; and a playback controller for playing back data starting from the basic unit in a data stream on the recording medium corresponding to the detected basic unit position information.

In another aspect of the present invention, there is provided a recording and playback apparatus including a data stream information generator for segmenting a data stream comprising input packet data into basic units of a predetermined size and generating data stream information having a plurality of basic unit information, each of the basic unit information of the basic unit including arrival time information of a first packet of data of a corresponding one of the basic units; a recording controller for recording the data stream is recorded in a first area of a recording medium and the data stream information is recorded in a second area of the recording medium; a data stream information processor for comparing the arrival time of a target position with arrival time information of each of a first packet of data of corresponding basic units, so as to search the arrival time information corresponding to the arrival time of the target position and for detecting position information of the basic unit corresponding to the searched arrival time information; and a playback controller for playing back data of the data stream recorded on the recording medium starting from the basic unit corresponding to the detected basic unit position information.

BRIEF DESCRIPTION OF THE DRAWINGS

The above objectives and advantages of the present invention will become more apparent by describing in detail embodiments thereof with reference to the attached drawings, in which:

FIGS. 4A and 4B show the structure of stream object unit information (SOBUI) used for fast searching of packet data according to the present invention;

DESCRIPTION OF THE PREFERRED EMBODIMENTS

The present invention relates to a method of generating special information on the position of data, for supporting fast searching while recording the packet data, a recording medium in which the generated information and the packet data are recorded together, a recording apparatus for recording the packet data and the special information for fast searching, and a playback apparatus for searching for a position from which a user desires to playback data, based on the special information and playing back the packet data starting from the desired position of the packet data. The recording apparatus of the present invention is an apparatus which records packet data transmitted from a transmitting party in a recording medium. The playback apparatus of the present invention is an apparatus which outputs recorded data to a decoder. Generally, the recording apparatus, the playback apparatus and the decoder can be made into one system. In describing the present invention, to simplify the description, packet data is limited to an MPEG-2 transport stream (TS).

When recording packet data, information on the arrival time of the corresponding packet data is added to the packet data. A data stream which is recorded through such operation is called a stream object (SOB) in the present invention. A plurality of SOBs may be recorded in a recording medium. For example, when a user starts and stops recording one time, one SOB is generated. Thereafter, if the user starts and stops recording again, another SOB is generated. In the present invention, a single SOB is segmented and the segments of the SOB are individually managed. In other words, a sequence of packet data with added ATSs is segmented into predetermined sizes (preferably, 256 kilobytes) each defined as a stream object unit (SOBU) which is a basic unit. As shown in FIG. 4A, the ATS of the first packet of an SOBU is defined as information which is named a first ATS (FATS). Stream object unit information (SOBUI), which is basic unit information, is generated based on the FATS of each SOBU.

Basically, a packet with one ATS simply constitutes a single SOBU. On the other hand, as shown in FIG. 4B, packets with multiple ATSs are collected and an extra header is added to the collected packet data to form a pack (generally, 2048 bytes) and a plurality of packs constitute a single SOBU.

Figure 1:
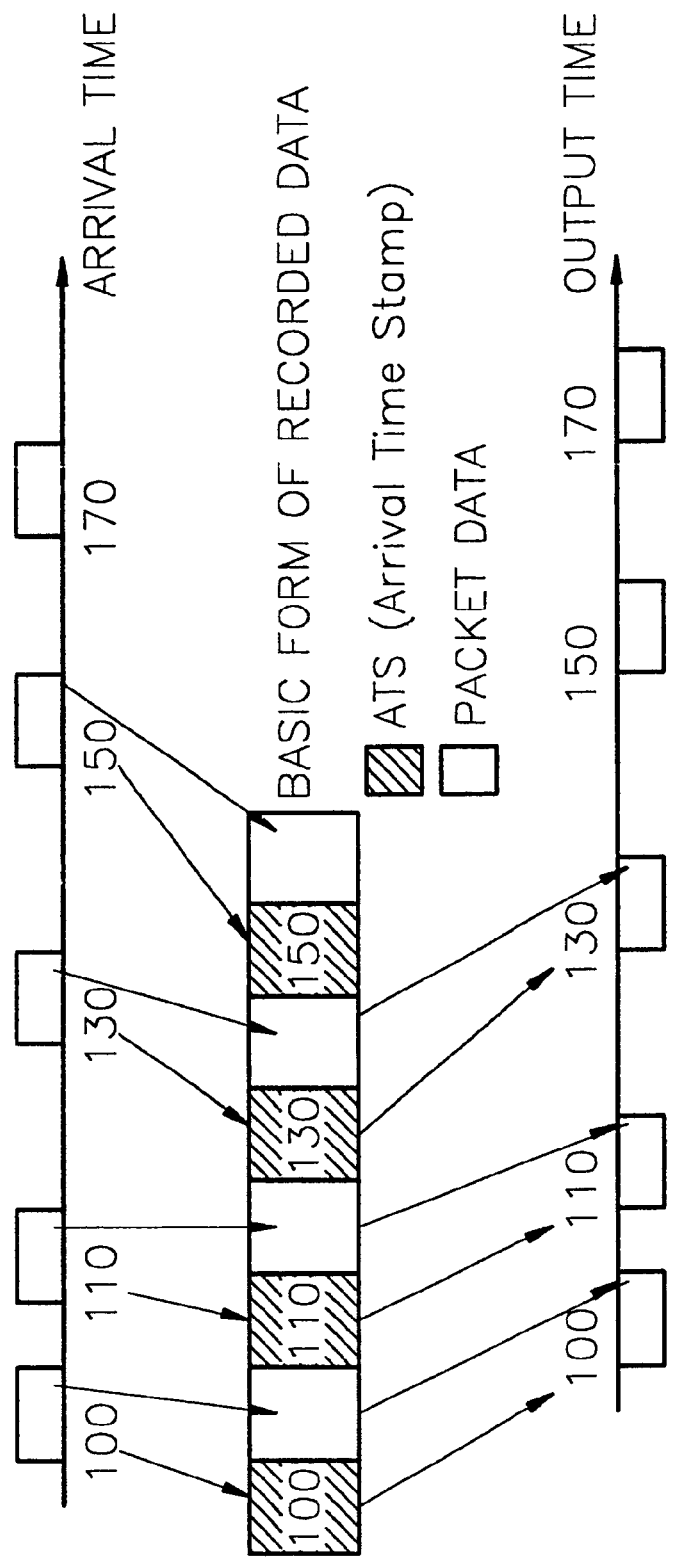
FIG. 1 shows the basic form of recorded data including input packet data and its arrival time information and the conceptional relation between the recorded data and data output time intervals during playback.
Figure 2:
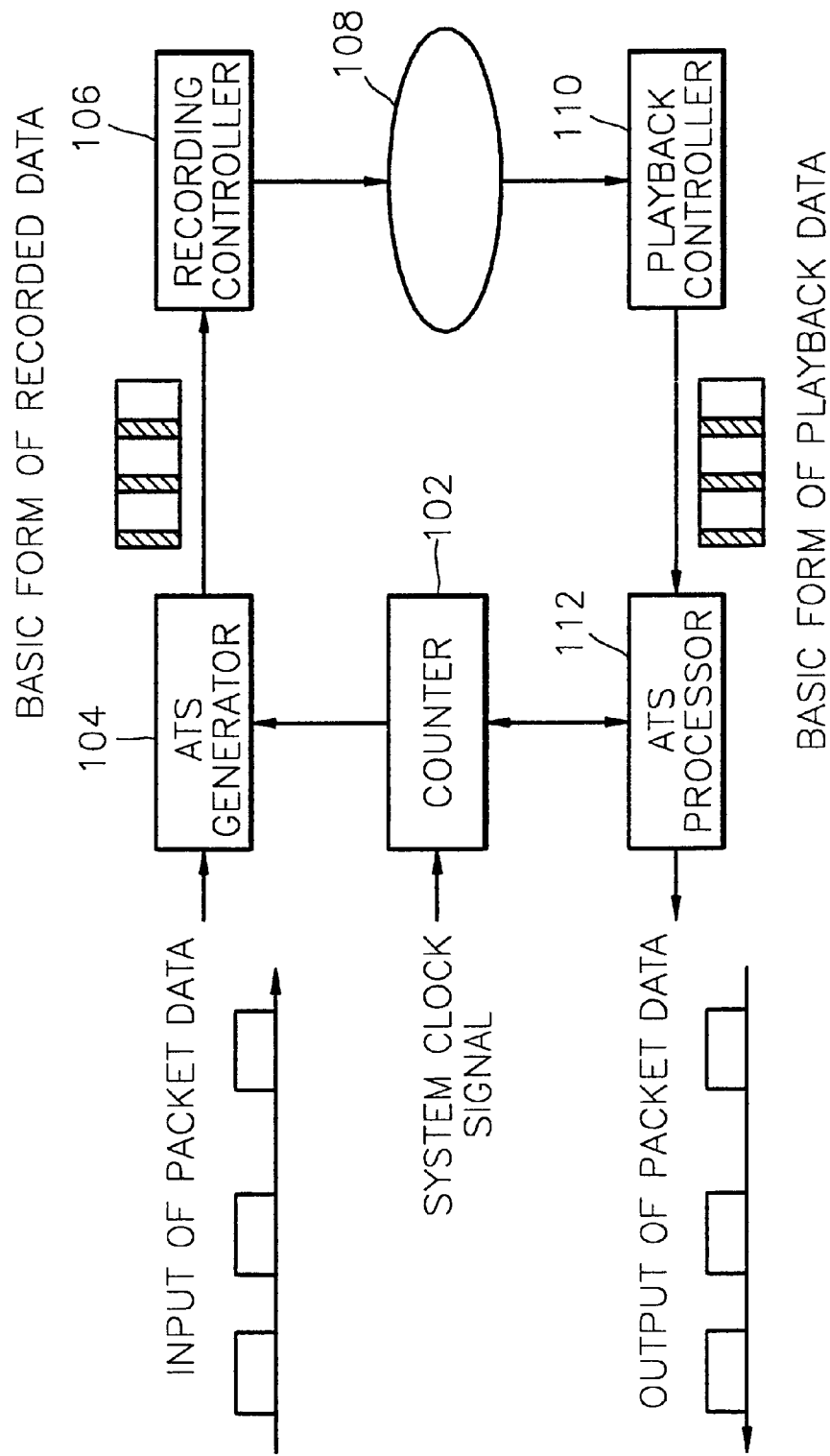
FIG. 2 is a block diagram showing a recording and playback apparatus for the packet data shown in FIG. 1.
Figure 3:
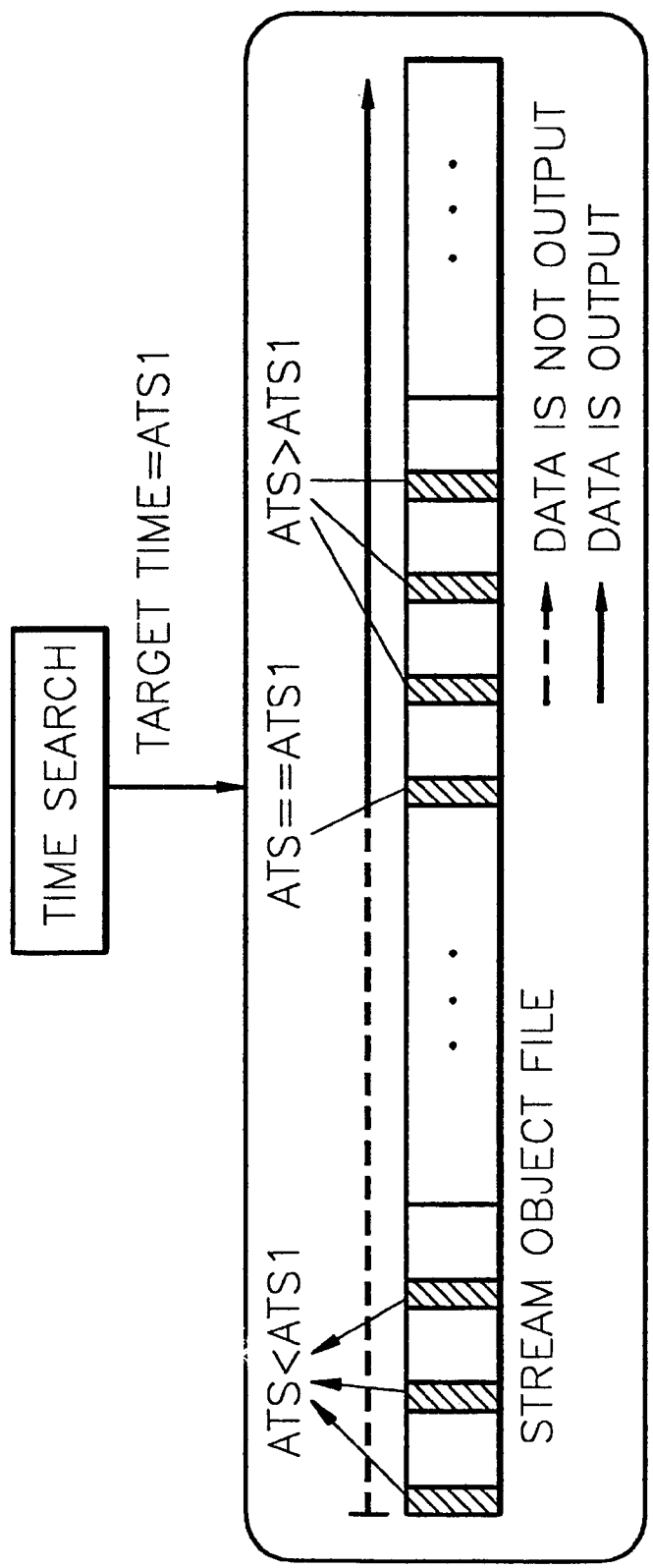
FIG. 3 is a diagram for explaining a conventional time search method for a packet data.
Figure 5:
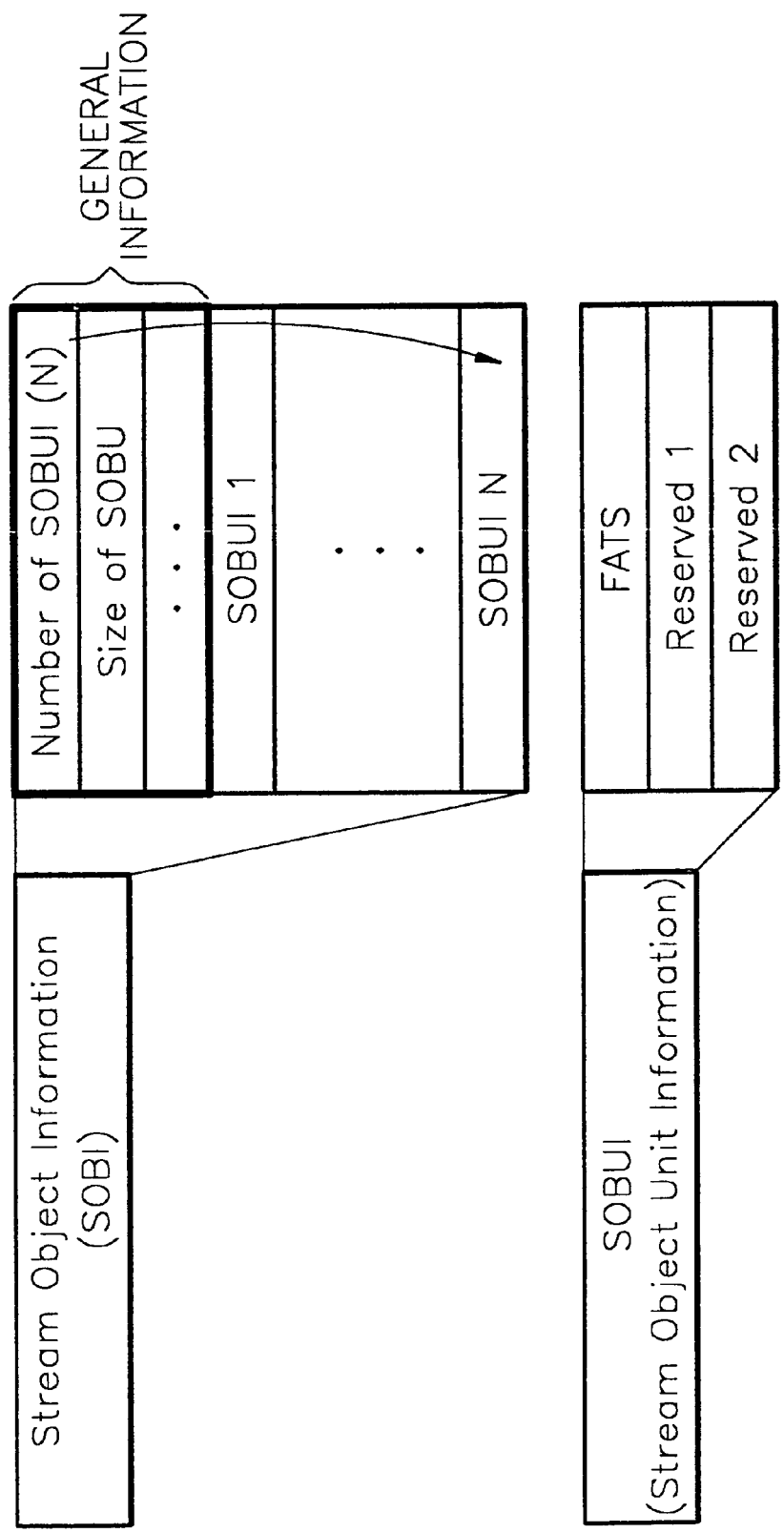
FIG. 5 shows an embodiment of the structure of stream object information (SOBI) according to the present invention.

As shown in FIGS. 4A through 5, as well as FATS of 6 bytes or 4 bytes, additional information of 4 bytes, which is represented by Reserved 1 and Reserved 2, may be added to a single SOBUI. The additional information Reserved 1 and Reserved 2 may also be each one byte. The additional information is used for managing smaller units within a single SOBU.

SOBUI is combined with general information to generate stream object information (SOBI) which is data stream information used for fast searching according to the present invention, as shown in FIG. 5. The general information includes information related to an entire SOB such as the number of SOBUIs and/or the sizes of SOBUs.

Figure 6:
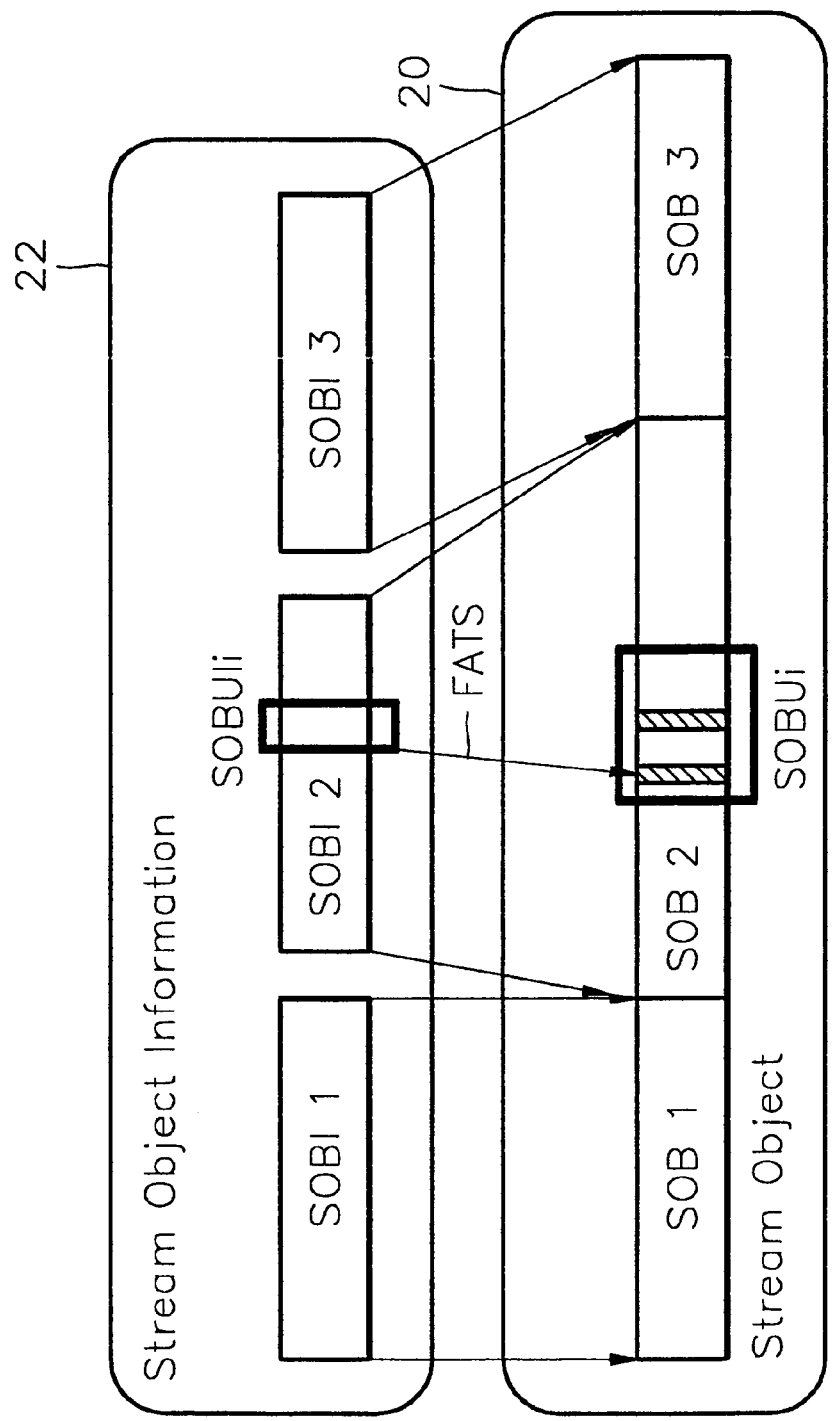
FIG. 6 shows the relation between a stream object and SOBI which are recorded in a recording medium according to the present invention.

On a recording medium of FIG. 6 according to the present invention an area 20 exists in which packet data with ATSs is recorded, and an area 22 exists in which special information for fast searching is recorded. The area 20 where packet data is recorded includes a plurality of SOBs. The area 22 where information for fast searching is recorded includes SOBIs which are information on the corresponding SOBs of area 20. The information for an i-th basic unit SOBUi within a second SOB corresponds to an i-th basic unit information SOBUIi within a second SOBI. In other words, the FATS of the i-th basic unit SOBUi within the second SOB is the first packet's ATS included in the i-th basic unit information SOBUIi within the second SOBI. Here, the area where packet data is recorded may be named a first area and the area where data stream information for fast searching is recorded may be named a second area. The following description concerns how to represent the ATS of packet data and the FATS of each basic unit.

A counter is driven by a system clock signal. In the method of representing a particular time using a value of the counter which is driven by a system clock signal, which is used in a general MPEG-2 system standard, the point in time at which a single packet is input into a decoder buffer is referred to as a decoding time stamp (DTS), and the point in time at which a single picture of decoded data is output is referred to as a presentation time stamp (PTS). The particular time is represented using DTS and PTS. At this time, the counter is driven by a 27 MHz clock signal. In an MPEG-1 system which was established prior to the MPEG-2 system standard, a 90 KHz system clock signal is used. In MPEG-2, a 27 MHz counter is provided as shown in FIG. 7 for compatibility with MPEG-1.

A frequency of 90 KHz is obtained by dividing 27 MHz by 300. As shown in FIG. 7, 9 lower bits, b0 to b8, represent a count value of a 0-to-299 counter (a counter having values from 0 to 299) which is driven by a 27 MHz system clock signal. Also, 32 upper bits, b16 to b47, represent a count value of a counter driven by a 90 KHz system clock signal. The 0-to-299 counter may be implemented by a 9-bit counter b15, are all set to 0 to align the rows of bytes, thereby comprising 2 bytes. A 90 KHz count value is generated by a 4-byte counter, and a 27 MHz count value is generated by a 6-byte counter as a whole.

Figure 7:
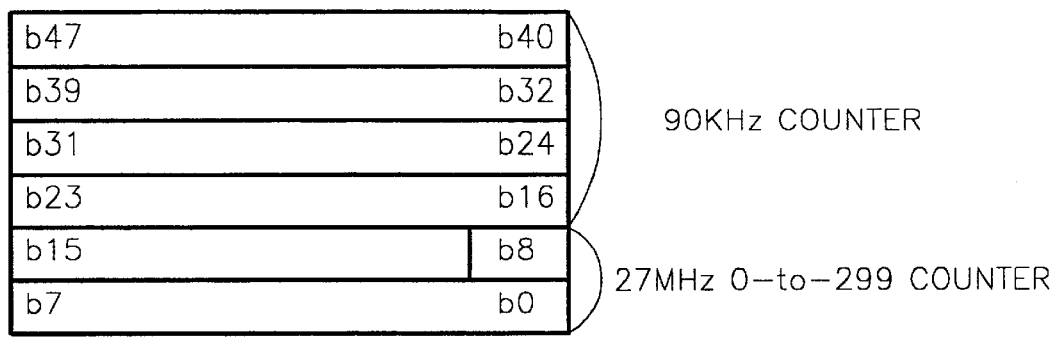
FIG. 7 shows the structure of a counter used in a Moving Picture Experts Group (MPEG)-2 system to give a better understanding of the present invention.

It is assumed that ATSs of packet data used in the present invention are formed by the counter as shown in FIG. 7. It is obvious that the present invention can be applied to other system clock signals and counters. However, system clock signals must be sufficiently fast with respect to the transmission speed of input packet data to ensure the playback is performed in time intervals similar to original time intervals in which the input packet data was transmitted.

An ATS value added to packet data is expressed by using the entire value of the 6-byte counter, as shown in FIG. 7, to ensure accurate time intervals between packet data. However, since the FATS of the first packet of a basic unit, which is stored in basic unit information, is used for finding a particular position but is not used during actual playback, the FATS may be recorded in a different form. The simplest method is to set a FATS to a count value using the entire 6 bytes. This method uses the most accurate value that can be represented so that it is most preferable in view of accuracy. However, a FATS of 6 bytes is required for each basic unit as basic unit information.

To decrease the size of a FATS, as shown in FIG. 7, only the 4 upper bytes may be used. The method using only 4 upper bytes is to represent data transmitted at 27 MHz using a 90 KHz count value. This method does not usually have problems, but a state such as that shown in FIG. 8A or FIG. 8B can occur when packet data is very small or is transmitted very fast.

Figure 8A:
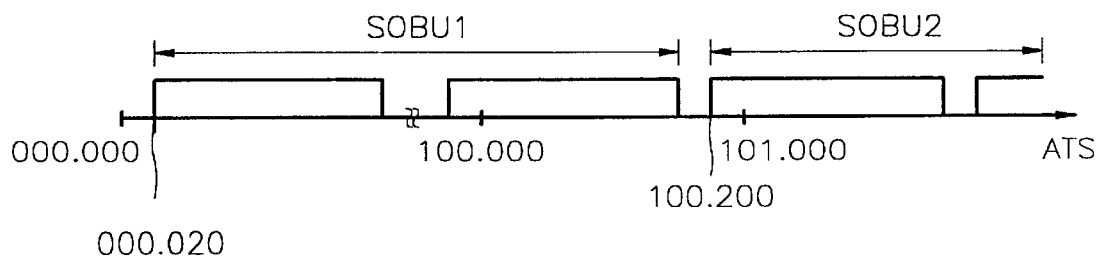
FIGS. 8A and 8B show the relation between a first arrival time stamp (FATS) and packet data when the FATS of each SOBU is recorded using a system clock signal of 90 KHz.

In FIG. 8A, the length of a single packet is longer than $\frac{1}{90}$ KHz. The arrival times of packets are differently represented when using a 90 KHz count value than when using a 27 MHz count value. When using the 27 MHz count value, the arrival time of the first packet of a basic unit SOBU1 is 000.020 and the arrival time of the first packet of a basic unit SOBU2 is 100.200. Here, among six digits representing an arrival time, the three upper digits correspond to a 90 KHz count value and the three lower digits correspond to a 27 MHz 0-to-299 count value. When using the 90 KHz count value, the arrival times of the first packets of the basic units SOBU1 and SOBU2 are 000 and 100, respectively. For example, when playing back data starting from 100.010, since the arrival time 100.200 of the basic unit SOBU2 is larger than the desired value in the case of representing the arrival time using a 27 MHz count value, data is played back starting from the basic unit SOBU1. In the case of using a 90 KHz count value, the arrival time of the basic unit SOBU2 is 100 so that the data is played back starting from the basic unit SOBU2. The actual start time of the basic unit SOBU2 is 100.200. However, the basic unit SOBU2 is the closest succeeding packet to the time 100.010 so that accurate playback operation can be achieved.

Figure 8B:
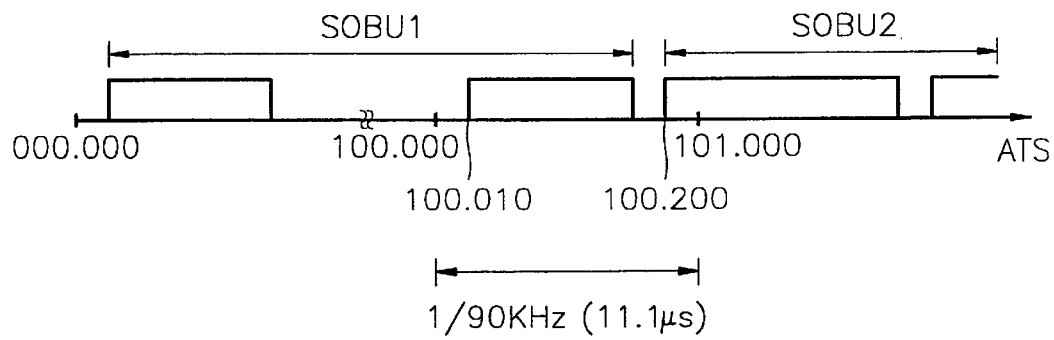

In FIG. 8B, the length of a single packet is smaller than $\frac{1}{90}$ KHz (11.1 $\mu$s) in the temporal aspect. When packet data is transmitted at a speed of 27 Mbps, a single packet has the size of 300 bits which is smaller than 38 bytes. Accordingly, in the case of representing arrival times of packets using a 90 KHz count value, the arrival times of different packets may have the same value. In other words, as shown in FIG. 8B, the arrival time of the last packet of the basic unit SOBU1 is 100.010 and the arrival time of the first packet of the basic unit SOBU2 is 100.200 when representing the arrival time using a 27 MHz count value. However, both arrival times are represented by 100 when using a 90 KHz count value.

In the case of representing the FATS of the first packet of a basic unit using a 90 KHz count value, when a user desires to playback data starting from 100.010, playback is performed starting from the basic unit SOBU2 since the arrival time of the first packet of the basic unit SOBU2 is 100. However, the last packet of the basic unit SOBU1 is the closest packet succeeding the desired time so that problems can occur when accurate playback is required. Accordingly, in this case, playback must be performed starting from the basic unit SOBU1 preceding the basic unit SOBU2 which is found based on the arrival time information of the first packets of basic units.

However, the length of a packet is usually longer that 38 bytes and a transmission speed is slow even though the packet is smaller than 38 bytes so that the transmission time of a single packet is longer than $\frac{1}{90}$ KHz. Consequently, even when the arrival times of the first packets of basic units are represented using a 90 KHz count value, no problems occur. Even if the transmission time of a single packet is smaller than $\frac{1}{90}$ KHz, problems do not occur as long as accurate playback is not required. When packet data is small and accurate playback is required, playback will be performed starting from the basic unit preceding a basic unit which is found based on basic unit information.

Figure 9:
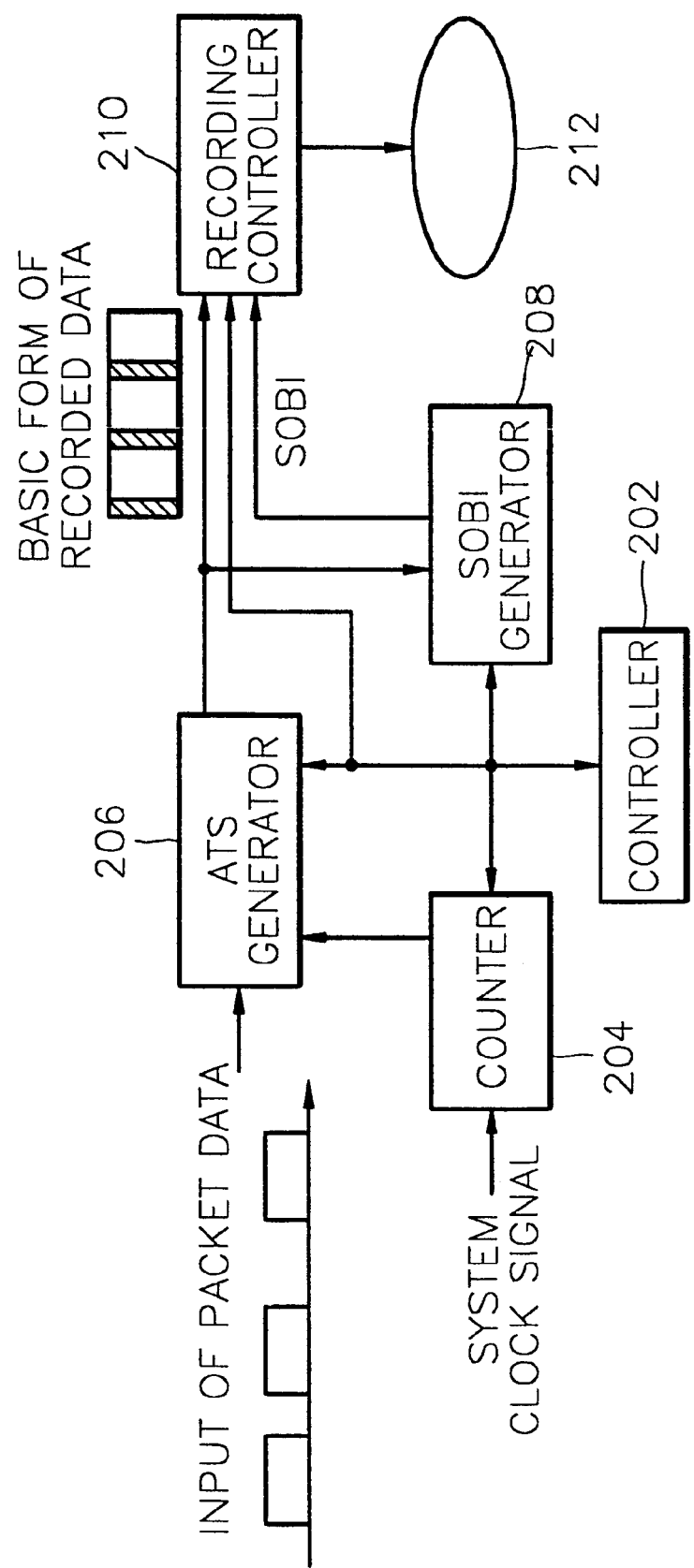
FIG. 9 is a block diagram of a recording apparatus according to an embodiment of the present invention.

FIG. 9 is a block diagram showing an embodiment of a recording apparatus according to the present invention. The recording apparatus includes a controller 202, a counter 204 driven by a system clock signal, an ATS generator 206 for receiving packet data and adding an ATS to the received packet data, an SOBI generator 208, and a recording controller 210 for recording the packet data to which the ATS has been added and an SOBI generated by the SOBI generator 208 in a recording medium 212.

More specifically, the SOBI generator 208 segments an SOB, which includes added ATSs, into SOBUs of a predetermined size and generates SOBUIs for the respective SOBUs. An SOBUI includes the FATS of the first packet data of a corresponding SOBU. A plurality of SOBUIs are combined with general information to generate an SOBI. The SOBI generator 208 can be implemented in the form of software operating in the controller 202.

During recording operation, the controller 202 sets the counter 204 to an initial value at the beginning of the operation. Thereafter, packet data is received and the recording operation starts. At the time when packet data is received, the ATS generator 206 establishes the count value of the counter 204 as the ATS of the corresponding packet data and adds the ATS to the packet data. The packet data with the added ATS is stored in the recording medium 212 via the recording controller 210. As described above, other additional information may be recorded together with the packet data and ATS to comply with the characteristics of the recording medium 212.

For example, as shown in FIG. 4B, when the characteristics of a recording medium require the management of data in units of 2048 bytes (a pack), to record packet data with an ATS while complying with the characteristics of the recording medium, additional data will be added and recorded. For illustrative purpose, additional data other than the ATS is neglected in the description of the present invention.

Meanwhile, for use in personal computers, a plurality of recorded SOBs may be all combined into a single file or they may be individually made into a plurality of files. The SOBI generator 208 segments recorded packet data into SOBUs each having a predetermined size, forms SOBUIs for the respective SOBUs, and generates an SOBI by combining the plurality of SOBUIs with general information. Each of the SOBUIs includes the FATS of the first packet of a corresponding SOBU. The SOBUI may also include additional information besides the FATS as represented by Reserved 1 and Reserved 2 shown in FIG. 4A and FIG. 5. For example, information on the smaller units within an SOBU may be recorded as the additional information. The sizes of SOBUs may be constant throughout all the plurality of SOBs. On the other hand, the sizes of SOBUs may be different in different SOBs. When the sizes of SOBUs are differently defined in different SOBs, the information on the size of a SOBU is included in general information on a recording medium such as the recording medium 212.

For example, in a case in which the size of an SOBU is set to 256 kilobytes and the capacity of a recording medium is 5 gigabytes, approximately 20,000 SOBUIs are generated based on the calculation 5 gigabytes/256 kilobytes. In a case in which each SOBUI is composed of only a FATS, when the FATS is composed of 4 bytes, the maximum size of the entire SOBUI is 78 kilobytes and when the FATS is composed of 6 bytes, the maximum size of the entire SOBUI is 117 kilobytes. In a case in which each SOBUI is composed of a FATS and additional information Reserved 1 and Reserved 2 of 2 bytes, the maximum size of the entire SOBUI is 157 kilobytes. In a case in which each SOBUI is composed of a FATS and additional information Reserved 1 and Reserved 2 of 4 bytes, the maximum size of the entire SOBUI is 196 kilobytes.

When recorded data is 6 Mbps video data, which is usually used in digital broadcasting, the data of 256 kilobytes corresponds to 0.35 seconds. When considering that a group of pictures (GOP) which is used as a basic unit of decoding in an MPEG video standard corresponds to 0.5 seconds, the size, 256 kilobytes, of an SOBU has substantially significant meaning.

In another example, in a case in which the size of an SOBU is 128 kilobytes, the number of SOBUIs is about 40,000. Accordingly, the total size of SOBUIs doubles as compared with the case in which the size of an SOBU is 256 kilobytes. In this case, although the amount of information is increased to double, more accurate management is possible.

At the time of terminating the recording, the controller 202 terminates the recording and records the SOBI, which is obtained by combining the SOBUIs with the general information, in the recording medium 212. The general information includes the number of SOBUIs. If recording is restarted by a user, data is recorded in such a manner that the data is added to an existing SOB as the part of the existing SOB or that a new SOB for the new data that is generated. When adding data to an existing SOB during recording, the size of an existing SOBI is increased. On the other hand, when a new SOB is generated during recording, a new SOBI is generated. Consequently, one SOB has one SOBI.

Figure 10:
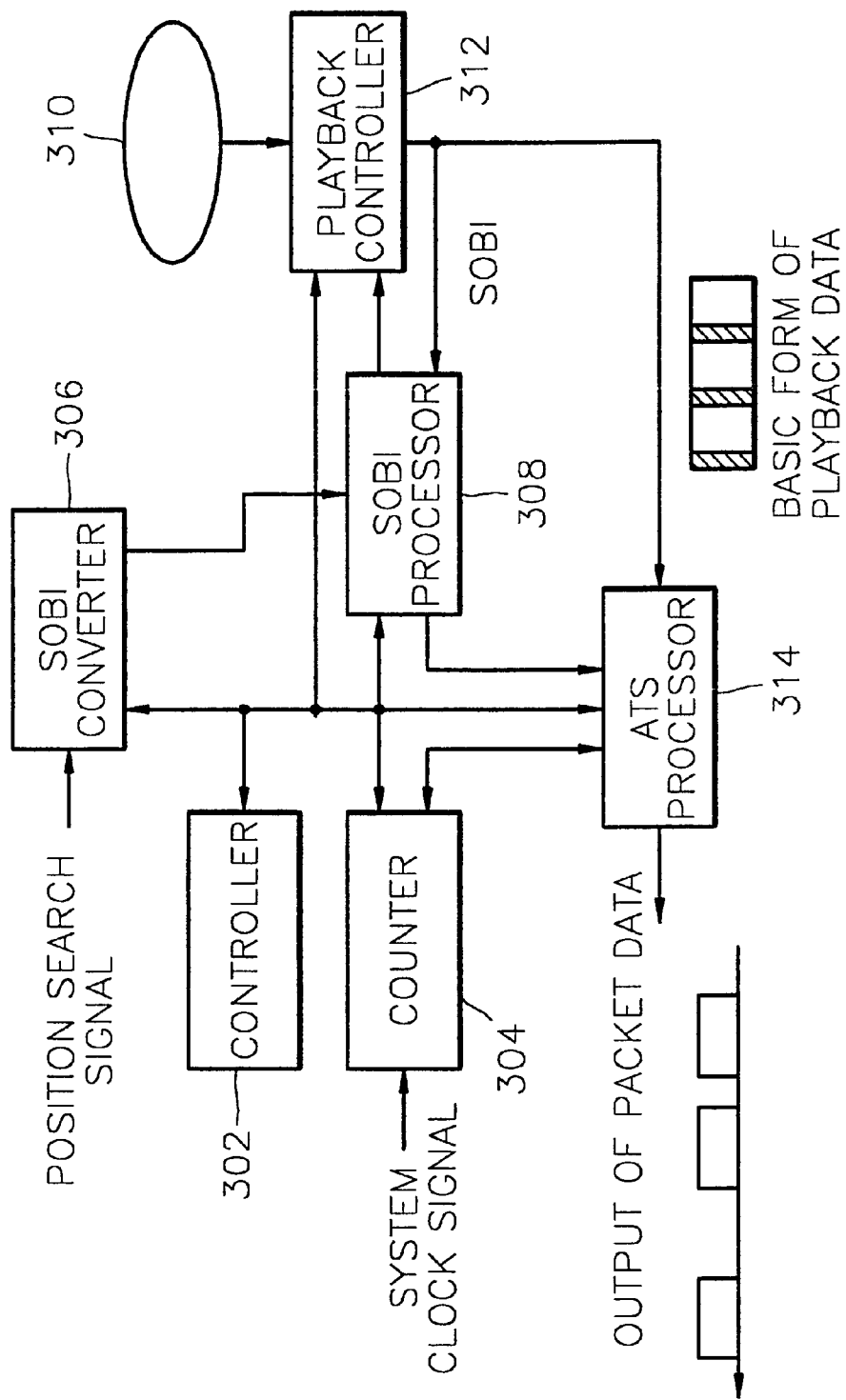
FIG. 10 a block diagram of a playback apparatus according to an embodiment the present invention.

FIG. 10 is a block diagram showing an embodiment of a playback apparatus according to the present invention. The playback apparatus includes a controller 302, a counter 304 which is driven by a system clock signal, an SOBI converter 306 for converting a search signal, which indicates a particular position entered by a user, into the target arrival time information of a particular SOB, an SOBI processor 308, a playback controller 312 for reading data from a recording medium 310, and an ATS processor 314.

The SOBI processor 308 reads the SOBUIs of an SOBI, which includes the target arrival time obtained by the SOBI converter 306, from the recording medium 310 via the playback controller 312 and compares the read SOBUIs with the target arrival time so as to determine position information of an SOBU including the target arrival time. The position information of the SOBU is sent to the playback controller 312. Subsequently, the playback controller 312 controls data to be played back starting from the SOBU including the target arrival time.

The ATS processor 314 sets the counter to the ATS of packet data which is first read. Thereafter, the ATS processor 314 compares the ATSs of packets with the count value of the counter 304 and outputs the corresponding packet data when the count value is equal to the ATS of the packet. The SOBI converter 306 and the SOBI processor 308 may be implemented in the form of software which operates in the controller 302. An actual position at which an SOBU is recorded is obtained by multiplying the obtained position of the SOBU by the size of the SOBU.

In simple playback operation, SOBs recorded in a recording medium are sequentially read. Packet data with ATSs, which is read sequentially, is provided to the ATS processor 314. The ATS processor 314 sets the counter 304 to the ATS of packet data which is first input, and simultaneously outputs the packet data. Thereafter, the ATS processor 314 compares the ATSs of packet data following the first packet data with a count value of the counter 304, and outputs the packet data when the ATS of the packet data is equal to the count value of the counter 304. After the output of one SOB has been completed, a subsequent SOB is read and the above process is repeated.

Time search operation in which data is played back starting from a particular point of an SOB will be described with reference to FIG. 11. Primarily, a user inputs a search signal indicating a particular position from which the user desires to playback data. For example, if a user desires to playback a program 2 starting from the position corresponding to one hour after the beginning of the program 2, the input information which indicates one hour after the beginning of the program 2 is converted into the arrival time information of an SOB2, which is represented by "ATS1=65", by the SOBI converter 306.

To convert the position desired by a user into the arrival time information of an SOB in the SOBI converter 306, information on the relation between a program and an SOB must be separately recorded. The converting operation may be implemented by software which operates in the controller 302 in the playback apparatus.

Alternatively, a control signal (ATS1=65), which indicates to perform playback starting from the position corresponding to the arrival time 65 of the SOB2, may be input to the SOBI converter 306 as a position search signal. Once a target SOB and a target arrival time are obtained, they are provided to the SOBI processor 308. The SOBI processor 308 reads an SOBI from the recording medium 310 and obtains an SOBUI which includes the target arrival time ATS1. The SOBUI including the target arrival time ATS1 may be obtained by comparing the FATSs of all the SOBUIs with the ATS1.

Figure 11:
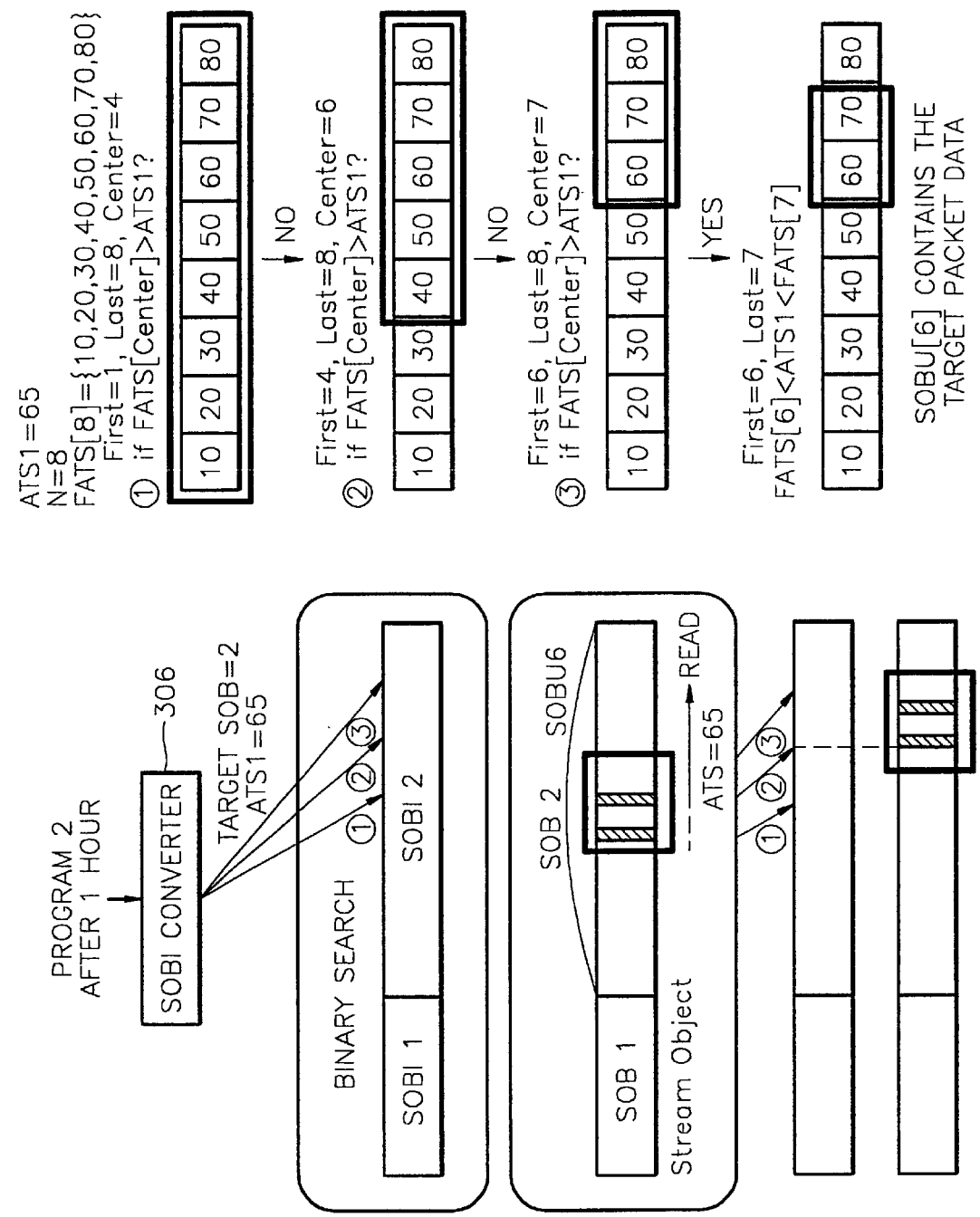
FIG. 11 is a diagram showing an example of fast searching which is realized using binary searching which can be applied to the present invention.

If the binary search as shown in FIG. 11 is applied to a case in which the arrival times of packets forming a single SOB show monotonic increase, much faster searching can be achieved. The binary search is an algorithm which is frequently used when determining where a particular number is located in a sequence of numbers.

For example, if there are a total 100 FATSs, it is determined which of the 100 FATSs is the 50th FATS which is at the center of the 100 FATSs and whether the ATS1 is larger than the 50th FATS. When the ATS1 is larger than the 50th FATS, this means that the desired position falls under one of the FATSs succeeding the 50th FATS including the 50th FATS. When the ATS1 is smaller than the 50th FATS, this means that the desired position falls under one of the FATSs prior to the 50th FATS. When the ATS1 is larger than the 50th FATS, the FATSs prior to the 50th FATS are all discarded and the FATSs succeeding the 50th FATS are checked. The ATS1 is compared with the FATS at the center of the group of the FATSs succeeding the 50th FATS, i.e., the 75th FATS. In FIG. 11, a case in which the total number of FATSs is 8, is shown as an example.

After repetition of the above operation, one position is finally determined. When the number of FATSs is N, the frequency of comparison according to the binary search is $\log_2 N$. For example, when there are 20,000 FATSs, the frequency is $\log_2 20000$, that is, the desired position is obtained after 15 comparisons. As compared with the method in which all the FATSs are sequentially compared with the arrival time information of a target SOB starting from the beginning, this method ensures very fast search. In FIG. 11, after three ($\log_2 8$) comparisons, it can be confirmed that the sixth SOBU includes the packet data which has the target arrival time.

Consequently, if the size of a single SOBU is considered after the position of an SOBUI corresponding to the ATS1 has been found, an actual position of the corresponding SOBU on a disk can be obtained. For example, if the FATS of the 100th SOBUI is smaller than the ATS1 and the FATS of the 101st SOBUI is larger than the ATS1, this means that the 100th SOBU includes packet data corresponding to the ATS1. In addition, if the size of a single SOBU is 256 kilobytes, it can be known that the 100th SOBU starts from the (100-1)*256K=25344th kilobyte from the beginning of a corresponding SOB. Therefore, playback is performed starting from the obtained position.

Accordingly, the ATS processor 314 of FIG. 10 compares the ATSs of input packet data with the ATS1 and discards packet data having ATSs smaller than the ATS1. The ATS processor 314 sets the counter 304 to the ATS of packet data when the ATS thereof is equal to the ATS1 or larger than the ATS1 by a minimum difference. Thereafter, the remaining packet data is processed in the same manner as in the simple playback operation.

In the above description, a recording apparatus and a playback apparatus are separately implemented as shown in FIG. 9 and FIG. 10, respectively. However, a recording and playback apparatus may be provided in which all the elements depicted in FIGS. 9 and 10 are included and a system clock signal, a counter, which is driven by the system clock signal, and a controller, are used in common.

As described above, the present invention generates a basic unit by segmenting packet data into units of a predetermined size and generates basic unit information for each basic unit. The basic unit information includes information indicating the arrival time of the first packet of a corresponding basic unit. This information is recorded with a data stream and used when quickly searching for a desired position during special playback such as a time search. If a fast search method such as binary searching is applied to the present invention, much faster searching can be realized.

What is claimed is:
1. A method of generating information used for fast searching, the method comprising:
    receiving packet data and adding an arrival time stamp of packet data to the received packet data;
    segmenting a data stream comprising the packet data, into a plurality of basic units, each basic unit having a predetermined size;
    generating basic unit information related to each of the basic units of the data stream; and
    generating data stream information including a plurality of the basic unit information, each of the basic unit information of the basic unit having arrival time information of a first packet of data of a corresponding one of the basic units.

2. The method of claim 1, wherein the data stream information further comprises general information related to the entire data stream, the general information including a number of the basic unit information and/or sizes of the plurality of basic units.

3. The method of claim 1, wherein the arrival time information of the first packets of data which are recorded in corresponding ones of the basic units are represented by a 6-byte count value which is obtained by counting according to a 27 MHz clock signal.

4. The method of claim 3, wherein each basic unit information further comprises a maximum of 4 bytes of additional information.

5. The method of claim 1, wherein the arrival time information of the first packet of data which is recorded in corresponding ones of the basic units are represented by a 4-byte count value which is obtained by performing counting according to a 90 KHz clock signal.

6. The method of claim 1, wherein each of the basic units has a size of 256 kilobytes.

7. The method of claim 1, wherein each of the basic units has a size of 128 kilobytes.

8. The method of claim 1, wherein the data stream comprises the packet data to each of which the arrival time information of a corresponding packet is added.

9. The method of claim 1, wherein the data stream comprises packs and each pack comprises a predetermined number of packet data to which the corresponding arrival time information is added, and an extra header.

10. A recording medium comprising:
    a first area having a data stream which includes packet data of a plurality of basic units of a predetermined size; and
    a second area having data stream information which includes a plurality of basic unit information of the basic units which have arrival time information of first packets of data of corresponding ones of the basic units, the basic unit which is obtained by segmenting the data stream into units of a predetermined size in the first area,
        wherein a desired position in the data stream of the first area is searchable by comparing an arrival time of the desired position with the plurality of basic unit information of the basic units which have the arrival time information of the first packets of data of the second area.

11. The recording medium of claim 10, wherein the data stream information further comprises general information related to the entire data stream, the general information including a number of basic unit information and/or sizes of the plurality of basic units.

12. The recording medium of claim 10, wherein the arrival time information of the first packets of data which are recorded in corresponding ones of the basic units are represented by a 6-byte count value which is obtained by counting according to a 27 MHz clock signal.

13. The recording medium of claim 12, wherein each basic unit information further comprises a maximum of 4 bytes of additional information.

14. The recording medium of claim 10, wherein the arrival time information of the first packets of data which are recorded in corresponding ones of the basic units are represented by a 4-byte count value which is obtained by counting according to a 90 KHz clock signal.

15. The recording medium of claim 10, wherein each of the basic units has a size of 256 kilobytes.

16. The recording medium of claim 10, wherein each of the basic units has a size of 128 kilobytes.

17. The recording medium of claim 10, wherein the data stream comprises the packet data to each of which arrival time information of a corresponding packet is added.

18. The recording medium of claim 10, wherein the data stream comprises packs and each pack comprises predetermined number of the packet data to which arrival time information is added, and an extra header.

19. A recording apparatus using a recording medium, comprising:
   an ATS generator receiving packet data and adding an arrival time stamp of packet data to the received packet data;
   a data stream information generator to segment a data stream comprising the packet data into basic units of a predetermined size and generating data stream information having a plurality of basic unit information, each of the basic unit information of the basic unit including arrival time information of a first packet of data of a corresponding one of the basic units; and
   a recording controller to record the data stream in a first area of the recording medium and the data stream information in a second area of the recording medium.

20. The recording apparatus of claim 19, further comprising:
   a counter driven by a system clock signal and initialized at a time when the data stream is input, to provide a count value; and
   an arrival time information generator to add the count value to the packet data as the arrival time information.

21. The recording apparatus of claim 19, wherein the data stream information generator is a controller implemented as software.

22. The recording medium of claim 19, wherein the arrival time information of the first packets of data which are recorded in corresponding ones of the basic units are represented by a 6-byte count value which is obtained by counting according to a 27 MHz clock signal.

23. The recording apparatus of claim 22, wherein each basic unit information further comprises a maximum of 4 bytes of additional information.

24. The recording medium of claim 19, wherein the arrival time information of the first packets of data which are recorded in corresponding ones of the basic units are represented by a 4-byte count value which is obtained by counting according to a 90 KHz clock signal.

25. The recording apparatus of claim 19, wherein the data stream information further comprises general information related to the entire data stream, the general information including the number of basic unit information and/or sizes of the plurality of basic units.

26. The recording apparatus of claim 19, wherein each of the basic units has a size of 256 kilobytes.

27. The recording apparatus of claim 19, wherein each of the basic units has a size of 128 kilobytes.

28. The recording apparatus of claim 19, wherein the data stream comprises the packet data to each of which arrival time information of a corresponding packet is added.

29. The recording apparatus of claim 19, wherein the data stream comprises packs and each pack comprises a predetermined number of packet data to which the arrival time information is added, and an extra header.

30. A playback apparatus for playing back data recorded in a recording medium, the recording medium comprising a first area having a data stream which includes packet data of a plurality of basic units of a predetermined size and a second area having data stream information which includes a plurality of basic unit information, each of the basic unit information of the basic units having arrival time information of a first packet of data of a corresponding one of the basic units, the playback apparatus comprising:
   a data stream information processor to compare an arrival time of a target position with the arrival time information of each of the first packets of data of the corresponding basic units, so as to search the arrival time information corresponding to the arrival time of the target position and to detect basic unit position information of the basic unit corresponding to the searched arrival time information; and
   a playback controller to play back data of the data stream recorded on the recording medium starting from the basic unit corresponding to the detected basic unit position information.

31. The playback apparatus of claim 30, wherein the recording medium comprises a plurality of data streams, and the playback apparatus further comprising a data stream information converter to convert the target position, which is input by a user, into the arrival time information of a particular one of the data streams.

32. The playback apparatus of claim 30, wherein the data stream information processor is a controller implemented as software.

33. The playback apparatus of claim 30, wherein the data stream information processor compares the arrival time of the target position with the arrival time information of the first packets of data of the corresponding basic units included in the basic unit information, and detects the basic unit position information of the basic unit corresponding to the arrival time of the target position.

34. The playback apparatus of claim 30, wherein the data stream comprises the packet data to each of which arrival time information of a corresponding packet is added.

35. The playback apparatus of claim 34, further comprising:
   a counter driven by a system clock signal to generate a counted value, wherein, during normal playback, the counter is set according to the arrival time information added to the first packet of data which is played back by the playback controller, and, during fast searching, the counter is set according to the arrival time information added to the packet data having the arrival time which is equal to or larger than a target arrival time by a minimum difference; and
   an arrival time information processor to output the packet data after removing the arrival time information added to the packet data when the counted value of the counter is equal to the arrival time information added to the packet data during the normal playback and provide the arrival time information added to the packet data having the arrival time which is equal to or larger than the target arrival time by a minimum difference, during the fast searching.

36. The playback apparatus of claim 30, wherein the data stream comprises packs and each pack comprises a predetermined number of packet data to which the arrival time information is added, and an extra header.

37. The recording medium of claim 30, wherein the arrival time information of the first packets of data which are recorded in corresponding ones of the basic units are represented by a 6-byte count value which is obtained by counting according to a 27 MHz clock signal.

38. The playback apparatus of claim 37, wherein each basic unit information further comprises a maximum of 4 bytes of additional information.

39. The recording medium of claim 30, wherein the arrival time information of the first packets of data which are recorded in corresponding ones of the basic units are represented by a 4-byte count value which is obtained by counting according to a 90 KHz clock signal.

40. The playback apparatus of claim 30, wherein the data stream information further comprises general information related to the entire data stream, the general information including the number of basic unit information and/or sizes of the plurality of basic units.

41. The playback apparatus of claim 40, wherein the playback controller plays back the data stream starting from the basic unit corresponding to an actual position on the recording medium, the actual position being obtained by multiplying the detected basic unit position information by the size of the basic unit.

42. The playback apparatus of claim 30, wherein each of the basic units has a size of 256 kilobytes.

43. The playback apparatus of claim 30, wherein each of the basic units has a size of 128 kilobytes.

44. A recording and playback apparatus using a recording medium, comprising:

an ATS generator receiving packet data and adding an arrival time stamp of packet data to the received packet data;

a data stream information generator to segment a data stream comprising the packet data into basic units of a predetermined size and generating data stream information having a plurality of basic unit information, each of the basic unit information of the basic unit including arrival time information of a first packet of data of a corresponding basic unit;

a recording controller to record the data stream in a first area of the recording medium and the data stream information in a second area of the recording medium;

a data stream information processor to compare an arrival time of a target position with the arrival time information of each of the first packets of data of the corresponding basic units, so as to search the arrival time information corresponding to the arrival time of the target position and to detect basic unit position information of the basic unit corresponding to the searched arrival time information; and a playback controller to play back data of the data stream recorded on the recording medium starting from the basic unit corresponding to the detected basic unit position information.

45. The recording and playback apparatus of claim 44, wherein the data stream comprises the packet data to each of which arrival time information of a corresponding packet is added.

46. The recording and playback apparatus of claim 44, wherein the data stream comprises packs and each pack comprises a predetermined number of packet data to which the arrival time information is added, and an extra header.

47. The recording and playback apparatus of claim 44, further comprising:

a counter driven by a system clock signal, to generate a count value;

an arrival time information generator to add the arrival time information to the packet data according to the count value of the counter; and an arrival time information processor to set, during normal playback, the counter according to the arrival time information added to the packet data which is played back by the playback controller, to set, during fast searching, the counter according to the arrival time information added to the packet data having the arrival time which is equal to a target arrival time or larger than the target arrival time by a minimum difference, and to output the packet data which is played back after removing the arrival time information added to the packet data when the count value of the counter is equal to the arrival time information added to the packet data.

48. The recording and playback apparatus of claim 44, wherein the arrival time information of the first packets of data which are recorded in corresponding ones of the basic units are represented by a 6-byte count value which is obtained by counting according to a 27 MHz clock signal.

49. The recording and playback apparatus of claim 48, wherein each basic unit information further comprises a maximum of 4 bytes of additional information.

50. The recording medium of claim 44, wherein the arrival time information of the first packets of data which are recorded in corresponding ones of the basic units are represented by a 4-byte count value which is obtained by counting according to a 90 KHz clock signal.

51. The recording and playback apparatus of claim 44, wherein the data stream information further comprises general information related to the entire data stream, the general information including a number of basic unit information and/or sizes of the plurality of basic units.

52. The recording and playback apparatus of claim 51, wherein the playback controller plays back the data stream starting from the basic unit corresponding to an actual position on the recording medium, the actual position being obtained by multiplying the detected basic unit position information by a size of the basic unit.

53. The recording and playback apparatus of claim 44, wherein each of the basic units has a size of 256 kilobytes.

54. The recording and playback apparatus of claim 44, wherein each of the basic units has a size of 128 kilobytes.

55. The recording and playback apparatus of claim 44, wherein the data stream information processor compares the arrival time of target position with the arrival time information of the first packets of data of the corresponding basic units included in the basic unit information, and detects the basic unit position information of basic unit corresponding to the arrival time of the target position.

56. The playback apparatus of claim 30, wherein the data stream information processor compares the arrival time of target position with the arrival time information of the first packets of data of the corresponding basic units included in the basic unit information using a binary search process.

57. The playback apparatus of claim 44, wherein the data stream information processor compares the arrival time of target position with the arrival time information of the first packets of data of the corresponding basic units included in the basic unit information using a binary search process.

* * * * *